Sept. 10, 1968 M. O. MATTWELL 3,400,891
IRRIGATION SYSTEM
Filed July 8, 1966 3 Sheets-Sheet 1

Sept. 10, 1968                M. O. MATTWELL                3,400,891
                               IRRIGATION SYSTEM
Filed July 8, 1966                                    3 Sheets-Sheet 2

United States Patent Office 3,400,891
Patented Sept. 10, 1968

3,400,891
IRRIGATION SYSTEM
Michael O. Mattwell, 1 Daniel Drive,
Glen Cove, N.Y. 11542
Filed July 8, 1966, Ser. No. 563,910
15 Claims. (Cl. 239—66)

ABSTRACT OF THE DISCLOSURE

An irrigation system for watering a land area at a plurality of locations by controlling with a designated number of controlling circuits, a corresponding plurality of solenoid operated sprinkler valves. Each controlling circuit is associated with and controls the valves of only certain sprinkler heads selected on the basis of having substantially equal operating pressure requirements. A central control unit having a panel board on which is depicted pictorially the land area being watered is provided, the board having a plurality of terminal means thereon in correspondence to the number of sprinkler heads in the field, the terminal means comprising part of the respective controlling circuits. A programmer is provided for connecting the respective controlling circuits with electrical power in predetermined sequential order.

---

The present invention relates to a system for irrigating large land areas. It refers more particularly to an irrigation system wherein all functions and operations of the system can be controlled both automatically and manually from a central location.

The task of irrigating large land areas has caused the development of various systems intended to achieve that purpose efficiently and economically. Thus, for example, irrigation systems have been designed with a view to supplanting with automatic controls the functions of workmen having to traverse the area being irrigated to operate control valves on the piping with which the irrigation water is carried to the areas being watered. To the latter end, systems are known in the art which permit one or several operators to operate the entire system from a number of control locations using for that purpose programmers or controller units at each location which control the watering devices in one of the "zones" into which the land area is divided. However, certain problems are associated with these prior art irrigation control systems. For one thing, the systems generally are not designed to enable shutdown thereof at any intermediate point in the operation cycle and thereafter pickup at the same point in the cycle when the system is once again placed in operation. In other words, it is possible for a portion or "zone" of land area to be watered and then with a shutdown, if the system automatically recycles when next turned on, a prolonged delay is encountered before the previously unwatered land sections are watered whereas additional and perhaps excessive rewatering of the previously watered land sections occurs. Furthermore, most prior art systems do not provide that normal automatic operation of the system can be interrupted at any given point in a cycle so that by manual means or other special control means it is possible to divert or concentrate the watering to a particularly parched segment of the land area. Additionally, "zone" controlled systems employing a number of strategically placed controller units generally require that the operators be well versed with the construction and operating cycle of the system equipment inasmuch as it is difficult for them to determine at any given point in time just what segment or "zone" of the land area is being watered and at what condition of control the system is in, as for example, the time remaining in the watering of a particular land segment or "zone."

An object of the present invention is to provide an irrigation system, the operation of which is controlled from one central location, the control arrangement being effective to operate in sequence a number of controlling circuits connected to the electrically operated watering devices employed in the system.

Another object of the invention is to provide an irrigation system having a central control center utilizing a single electronic programmer with which all automatic and manual functions of control and operation of the system are effected for precision watering of large land areas including golf courses, industrial and residential lawns, farms and the like.

Another object of the invention is to provide an improved electronic controlled irrigation system in which the programming and timing circuits thereof are arranged for maximum versatility and flexibility. Only one electronic programmer is used to control as many sequentially operated controlling circuits as required for a specific application with each controlling circuit being used to control the operation of a number of electrically operated watering devices.

A further object of the invention is to provide at the central control location a pictorial representation of the land area being watered in color on a panel board to scale, the representation also showing the location of each watering device. The watering devices are denoted by means of plug-in terminal means which comprise part of the controlling circuits of the system and through which the respective electrically operated watering devices receive power.

Another object of the invention is to provide the system with a "Time-Remaining" indicator which continuously indicates the time remaining in the cycle of operation of any of the controlling circuits in the system.

Another object of the invention is to provide the system with a "Memory" circuit means which, upon activation of any one of several system safety devices such as a pump high pressure cut off, locks in the controlling circuit in operation at the time of the activation of the safety device so that the system, when restored to operation, will pick up the sequence at the point and condition thereof when the stoppage occurred.

Another object of the invention is to provide a simple means for quickly changing the sequence of operation of the watering devices rapidly with quick-connect and disconnect means at the central location thereby to control manually the remotely located watering devices.

Another object of the invention is to provide the system with a separate circuit means for manually operating the watering devices in the system without regard for the automatic operation state of the system.

Another object of the invention is to provide means in the irrigation system with which one or more watering devices can be added to or removed from the control of any controlling circuit during automatic operation without disrupting the sequence of controlling circuit operation.

Another object of the invention is to provide a recycle device in the system so that several short periods of watering can be observed therewith in lieu of one long period of watering thereby to allow the soil to absorb water slowly and prevent soil leaching and run-off.

Another object of the invention is to provide an irrigation system in which the water pressure at each watering device is maintained within predetermined limits thereby to provide even water distribution from the watering device to its outer designed spraying radius, regardless of the difference between the elevation of the watering device and the pump unit and dynamic pressure losses in the supply piping.

Still another object of the invention is to supply and maintain a constant operating voltage for the system programmer and a variable low voltage supply for the electrically operated watering devices.

Another object of the invention is to provide a constant total resistance in each of the controlling circuits regardless of the difference in wire length or wire size connected with the electrically operated watering devices controlled therewith.

A further object of the invention is to provide a simple yet novel form of waterproof connection means for connecting the control and common wire power leads to the corresponding wires of the electrically operated watering devices.

Other objects of the present invention will in part be obvious and will in part appear hereafter.

The invention accordingly comprises the features of construction, combination of elements and arrangement of parts which will be exemplified in the construction hereinafter set forth and the scope of the invention will be indicated in the claims.

According to the invention the irrigation system, which is suited for watering large land areas of any description, includes a central control location at which is located an electronic programmer unit which is employed to control fully automatic operation of the system. Also provided at the central location is a panel board on which is pictorially depicted in scale an outline of the land area being watered. The pictorial representation has depicted thereon, in correspondence to the actual field locations, each of the electrically operated watering devices with which the land is watered. The electronic programmer unit is used to control operation of a number of separate electrical controlling circuits, each of which is associated with and effective to control the operation of a number of watering devices. In this manner, the watering can be effected with pumping equipment which does not have to be unnecessarily large with respect to the rated pump capacity and size of the piping which carries the water from the pump unit to the land area. According to the invention, the electronic programmer unit is designed to control automatically the operation of the watering devices in each controlling circuit for a predetermined time, automatically shifting control at the end of each controlling circuit time period to another controlling circuit until all of the watering devices in the entire system have been operated for the required time to completely irrigate the entire land area. If for any reason the operation of the system is stopped at an intermediate point in the complete irrigation cycle, means are provided in the programmer unit to reinitiate the operation thereof at the leave-off point when the system is restarted. In a representative embodiment of the invention, the irrigation system is utilized for the watering of a golf course. In this arrangement, each hole of the golf course is provided with a number of sprinkler head type watering devices with the electronic programmer unit being provided with a number of controlling circuits each of which is associated with a number of the sprinkler heads, as for example, seven. The sprinkler heads operated by each controlling circuit are preferably selected with consideration to including in each controlling circuit sprinkler heads requiring substantially equivalent operating head pressures, taking into account the hydraulic pressure loss due to distance of each sprinkler head from the pumping unit as well as the elevation differential between the sprinkler head location and that of the pump unit. The electronic programmer unit when placed in operation functions to control a first controlling circuit and the sprinkler heads operated therewith with consequent watering of the course at the sprinkler head locations for a predetermined period of time. At the end of that time period a second controlling circuit and the sprinkler heads associated therewith (once again selected for inclusion in the particular circuit arrangement by reason of the static and dynamic hydraulic pressure loss associated with the respective sprinkler heads) is placed under control of the electronic programmer unit automatically to continue the watering. The electronic programmer unit will then continue to control sequentially the operation of the remaining controlling circuits until ultimately the entire golf course is watered. The apparatus of the system is designed such that it includes pressure sensing means which operate responsively to any variation of the pressure output from the pumping unit between predetermined limits to adjust automatically the speed of the pumping drive means to return the output pressure to a requisite level. This latter feature is important inasmuch as the sprinkler heads usually require water supply at a particular constant pressure level to give maximum and most effective spraying of the region around which they are located.

The central control location apparatus may also include a "circuit memory" device connected to any one of a number of system safety devices, as for example, one which becomes operative to shut down the pump drive means any time the output pressure of the pumping unit exceeds a certain value, the device being effective to shut off the programmer unit to prevent interdiction of the proper sequential operation thereof. It is particularly desirable to be able to immediately shut down the programmer unit as described when the system is shut down in order that when the system is placed back in operation, the programmer unit picks up control of the watering cycle at the same point where it left off thereby insuring that a proper watering of the entire course is carried out in the intended manner. The invention includes other features and devices for performing various functions of system control which will be made manifest in the course of the description of the invention.

According to the invention, the operation of the system also can be effected by manual control, the devices utilized for same being capable of overriding the automatic control function of the programmer unit. Thus, if soil conditions on the golf course require special or extra watering of one particular playing hole or portion thereof, it is possible for the operator at the central control location to connect the controlling circuits associated with the sprinkler heads on the particular playing hole with electrical power at the central control location merely by inserting jack plugs in appropriate outlets on the central control panel board, and thus operate the sprinkler heads at the remote field locations.

For a fuller understanding of the nature and objects of the invention, reference should be had to the following detailed description taken in conjunction with the accompanying drawings, in which:

FIGURE 1 is a perspective view of the central control location apparatus which includes therein the programmer unit, the panel board on which is pictorially depicted the various watering outlets of the area being watered and various other control and safety devices.

FIGURE 2 is a partial outline of the playing holes of a golf course as they appear on the central control location panel board and corresponding to the actual field layout of the golf course, the view further showing the sprinkler heads associated with each playing hole and with which they are watered and also the power wiring associated therewith, the wiring shown at the bottom of FIGURE 2 being housed within the control apparatus at the central location and being a continuation of the wiring shown at the top of FIGURE 3.

FIGURE 5 is an elevational view of a novel connection means employed for connecting together the field power leads with which each of the sprinkler heads is electrically connected to the central control location.

FIGURE 6 is a vertical sectional view on somewhat larger scale of the connection shown in FIGURE 5.

Throughout the description like reference numerals are used to denote like parts in the drawings.

Figure 1:
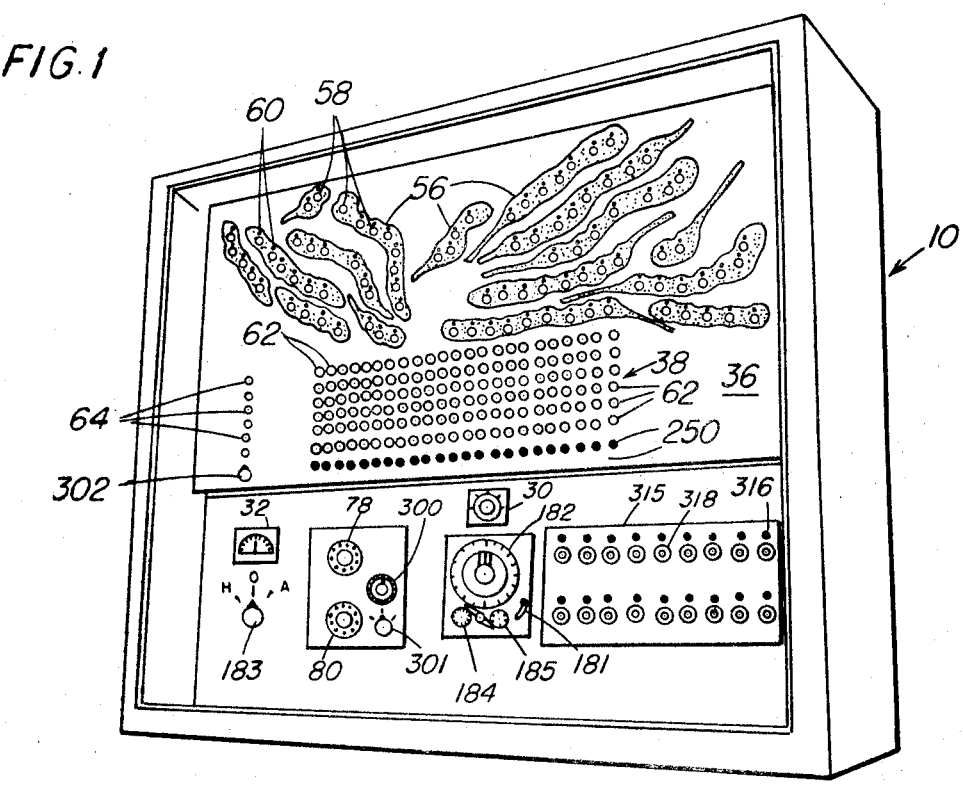

For purposes of convenience, the irrigation system of the present invention will be described in terms of the manner in which same would be used for irrigating a golf course. However, it will be readily apparent to those skilled in the art that the invention has broader application for irrigating other land areas including parks, farms, race tracks and the like and particularly where it is sought to reduce the labor involved in carrying out the irrigation. The usual golf course is provided with eighteen playing holes set out over a large expanse of land. Moreover, the terrain of the course generally is undulating, i.e., it has numerous hills and depressions. Each playing hole generally will vary in length from each of the others but will have the usual tee, fairway, trap and green areas. With present-day sprinkler equipment and taking into account average ranges of playing hole length, a golf course can require as many as two hundred or more sprinkling outlets located around the course to properly water same. In general, the number of sprinkling outlets required to water a particular playing hole may be as few as six or as many as twelve. Obviously it is impossible to water the golf course with all sprinkling outlets or sprinkler heads operating concurrently as this would involve providing a pump unit and piping of such enormous size as to be physically difficult to install on the course and prohibitive in cost with respect both to installation and maintenance thereof. The common practice then is to water the course over a long period of time, as for example, during a twelve hour period commencing at 7 p.m. in the evening and ending at 7 a.m. in the morning. During this time period the course is watered by operating only a few (for example six to ten) sprinkler heads simultaneously. The foregoing can be achieved with the irrigation system of the present invention by arranging the sprinkler heads in groups of six to ten sprinkler heads each, each group being associated with a selected one of a number of system controlling circuits and watering with each circuit for a period of about zero to sixty minutes.

An important feature of the irrigation system of the present invention is that the watering of the entire golf course can be controlled from a central location, for example, the grounds keeper's house. Thus all of the equipment of the system with the exception of field wiring, pumping equipment, piping and certain minor additional field control devices is all contained within the central location readily accessible for operating the system as well as for repairing, testing and monitoring same.

The system equipment of the present invention first will be enumerated in general terms and thereafter described in greater detail. The most important component of the equipment is a control unit 10 which is illustrated in general detail in FIGURE 1 and which is at the central location. The control unit 10 serves to house all of the devices with which system operation is controlled automatically as well as manually. These last mentioned devices are depicted schematically in the wiring diagram of FIGURE 3 and include, inter alia, an electronic programmer 12 with which the operating sequence and operating times of the after described controlling circuits are controlled, a controlling circuit assembly board 14, a manual control panel 16 with which manual control of the sprinkler heads in the field can be effected, a pump unit output pressure control assembly 18 for automatically maintaining pump pressure within the prescribed limits during system operation, the assembly 18 including a manual pressure control sub-assembly 20; an alternate timing switch control unit 22 for controlling automatic operation of the system, a constant output voltage transformer unit 24 to power the electronic programmer 12, a "memory circuit" device 26 with which the operation of the electronic programmer 12 is stopped upon occurrence of system shut down and "memorized" so that the electronic programmer operates thereafter when the system is restarted in proper programmed sequence from the point where it left off, a multitap step down transformer 28 to power the electrically operated sprinkler heads in the field, a recycle unit 30 to recycle automatic operation of the system if required, a circuit operation time remaining indicator 32 and a resistor assembly 34 to give all controlling circuits the same total resistance value. The control unit 10 also includes a panel board 36 whereon is pictorially represented in scale, plan outline, the actual layout of the golf course playing holes, the pictorial representation showing the location of each sprinkler head in the field (FIGURE 1) as well as being provided with a matrix 38 of quick connect terminals the purpose of which will be described later on in the description.

The system equipment located in the field includes a pumping station having a pump unit 40 and a drive means 42 with which the pump unit is operated. The drive means may be one of various types but for purposes of description herein is considered to be a gas turbine engine operated with natural gas fuel. Suitable water mains 44 for delivering water to each of the playing holes are provided, as are branch lines 46 for connecting each main line with the water control valves 48 associated with each sprinkler head, the control valves being operated by electrical solenoids 50. The sprinkler heads 52 connected with the control valves 48 are preferably pop-up units, i.e., they are housed in the ground and rise therefrom through hinged cover plates at surface level when placed in operation. The field equipment also includes a number of manual field control switch units 54 with which operation of the respective sprinkler heads 52 may be controlled from the field.

Figure 2:
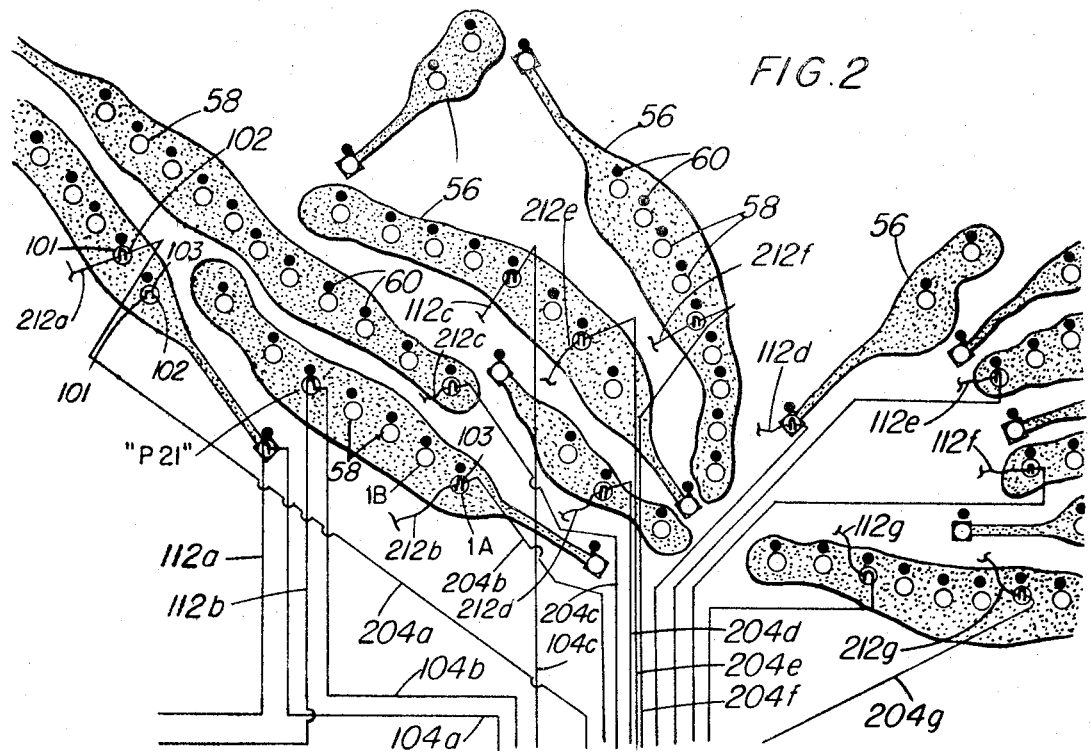
Figure 3:
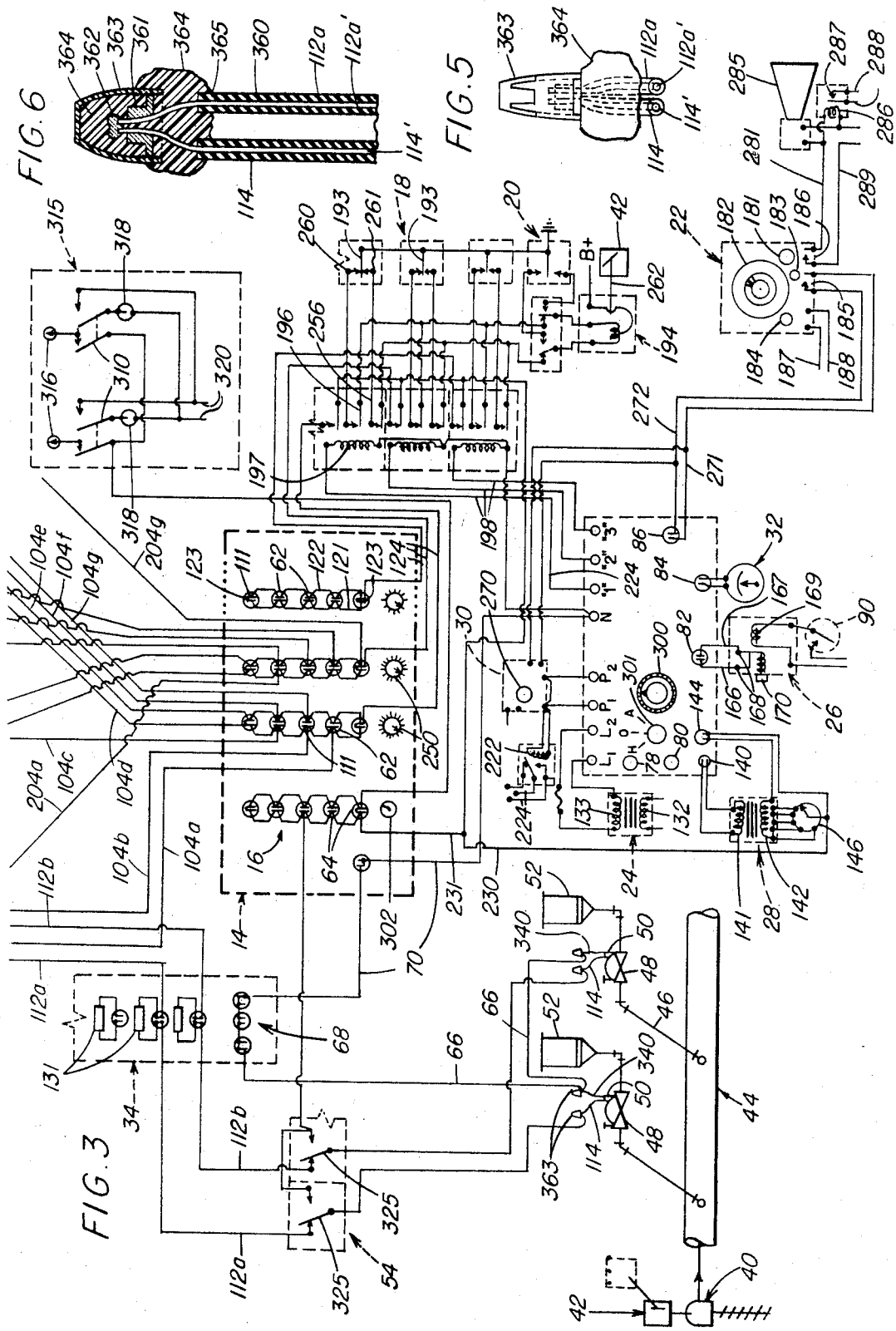
FIGURE 3 is a wiring diagram of the apparatus at the central control location showing the manner in which same is connected with the respective controlling circuits as well as with various control and safety devices included in the system.

Referring now in detail to FIGURES 1 to 4 of the drawings and a specific description of the system equipment, the equipment at the central control location includes the control unit 10 which is constituted of a suitably sized cabinet, the front upper portion of which is provided with panel board 36. Panel board 36 is preferably made of plastic or other nonconductive material and is of sufficient dimension to permit a graphic or pictorial reproduction of the plan outline of the golf course to be made thereon at a scale of about $\frac{1}{1000}$ of the actual course size. The pictorial representation is an actual depiction of the golf course playing holes 56, the latter being shown in true shape. Along each playing hole depicted, the panel board is provided with a number of quick connect terminal outlets 58 which correspond to the number and location in the field of the respective sprinkler heads 52 with which the playing hole is watered and which are accessible from both the front and rear sides of the control unit 10. Also supported in the panel board adjacent to each playing hole terminal outlet is an indicator lamp 60 which, when the corresponding sprinkler head in the field is operating on a power circuit through the panel board in automatic control condition or in certain conditions of manual control as will be described later, will light to denote that condition. For convenience of identifying the respective panel board terminal outlets indicia designating the sprinkler head associated therewith can be used, as for example, the first playing hole sprinkler heads could be designated 1–A, 1–B, etc. Also indicia is employed to denote the pressure drop associated with each sprinkler head. Thus "P–21" indicates a total pressure drop of 21 p.s.i.g. between the pump and the sprinkler head. Each of the playing hole terminal outlets constitutes in effect a power transfer means with which electrical power is transferred from the central control location to the sprinkler head solenoids and is comprised of a pair of terminals, i.e., a left hand terminal 101 and a right hand terminal 102 with the terminals being interconnected by means of a clip connector 103 at the front and rear side of the panel board and with the respective indicator lamps being connected with the terminals 101, 102 in such manner as to be energized simultaneously with the terminals. The arrangement of the terminals 101, 102 provides for connecting power leads from the panel board 36 to the solenoids 50 at the water control valves 48 in the field in the following manner. As seen in FIGURES 2 and 3, a first series of power leads 104a–104g comprising part of a corresponding first controlling circuit are connected with the right hand terminal 102 of a number of playing hole terminal outlets 58 on the panel board and one terminal 111 of an associated quick connect terminal outlet 62 mounted in the panel board 36 below the pictorial representation thereon and arranged thereon as one of a matrix of such terminal outlets, the matrix being generally denoted at 38 in FIGURE 1. The terminal matrix 38 is comprised of as many horizontally spaced vertical rows of terminal outlets 62 as there are separate controlling circuits in the system with the terminal outlets 62 in similar manner to panel board terminal outlets 58 being accessible from both the front and rear of the control unit. Each vertical row of the terminals 62 also constitutes a power transfer means and is associated with and comprises part of one of the controlling circuits. Field power leads 112a–112g are used to connect the left hand terminal 101 of each playing hole terminal outlet 58 with one of the terminal connector leads 114 of the associated solenoid 50 at the field control valve, with the field power leads 112a–112g being led outwardly from the back of the control unit 10 to the field underground. As was mentioned the first series of power leads 104a–104g are associated with the leftmost vertical row of terminal matrix terminal outlets 62 and correspondingly the first controlling circuit. A similar arrangement of a second series of power leads 204a–204g comprising part of a second controlling circuit are also provided and are connected in the same manner as just described, these power leads 204a–204g being associated with the second leftmost vertical row of terminal outlets 62 and a second group of playing hole sprinkler heads 52. Correspondingly, field power leads 212a–212g associated with the second controlling circuit are used to connect the left hand terminals 102 of the panel board terminal outlets 58 with the solenoids in the field controlled by said second controlling circuit.

As many additional controlling circuits as may be required to operate the remaining sprinkler heads in the system are provided and are connected in the same manner as above described. For example, a third controlling circuit including as part thereof the third leftmost vertical row of terminal outlets 62 in the matrix 38 is utilized to control a particular group of sprinkler heads in the field. Only three vertical rows of terminal outlets 62 in the matrix 38 have been illustrated in FIGURE 3 as it is believed within the comprehension of those skilled in the art to discern the manner in which the remaining controlling circuits are arranged.

For convenience the terminal outlets 62 of each vertical row in the matrix are interconnected by connector leads as at 121 and 122, and the left and right hand terminals of the topmost and lowermost terminal of each row are interconnected by means of a clip member 123 located at the rear of the panel board. In this manner it is only necessary that one connector lead 124 be used for connecting all terminals in the corresponding row to power.

As will be noted in FIGURES 1 and 3, a vertical row of quick connect terminal outlets 64 are provided at the control unit for use in conjunction with manual control of the irrigation system, these terminal outlets 64 being spaced a distance to the left of the terminal matrix 38. The quick connect terminal outlets 64 also are wired together in the manner applicable to each matrix terminal outlet vertical row and comprise part of a manual control operating circuit functioning as will appear later in the description.

Each of the field power leads 112a–112f, 212a–212f connected between the control unit 10 and the solenoids 50 at the sprinkler head control valves 48 in the field is connected in series with a resistor 131 of predetermined value and to that end the control unit has at the back thereof a resistor panel 34 mounting the various resistors 131. The purpose of adding the resistors 131 in circuit with the respective field power leads is to equalize the total line resistance for all power connections to the solenoids 50 inasmuch as the field power lead lengths and wire sizes will vary from sprinkler head to sprinkler head. In this manner the operating voltage at each solenoid will be the same, thereby insuring that all solenoids 50 operate to open the respective water control valves 48 in the same precise manner. The values of the various resistors 131 are easily determined at the time the system is installed by measuring the voltage drop through the field power leads as well as that in the solenoid winding, terminals, switches and common connector leads 66. The common connector leads 66 associated with each solenoid are connected to a terminal outlet bank at the control unit as at 68 from whence the common loop extends as a single lead 70 to the neutral terminal N of the electronic programmer 12, the construction and function of which will now be described.

Figure 4:
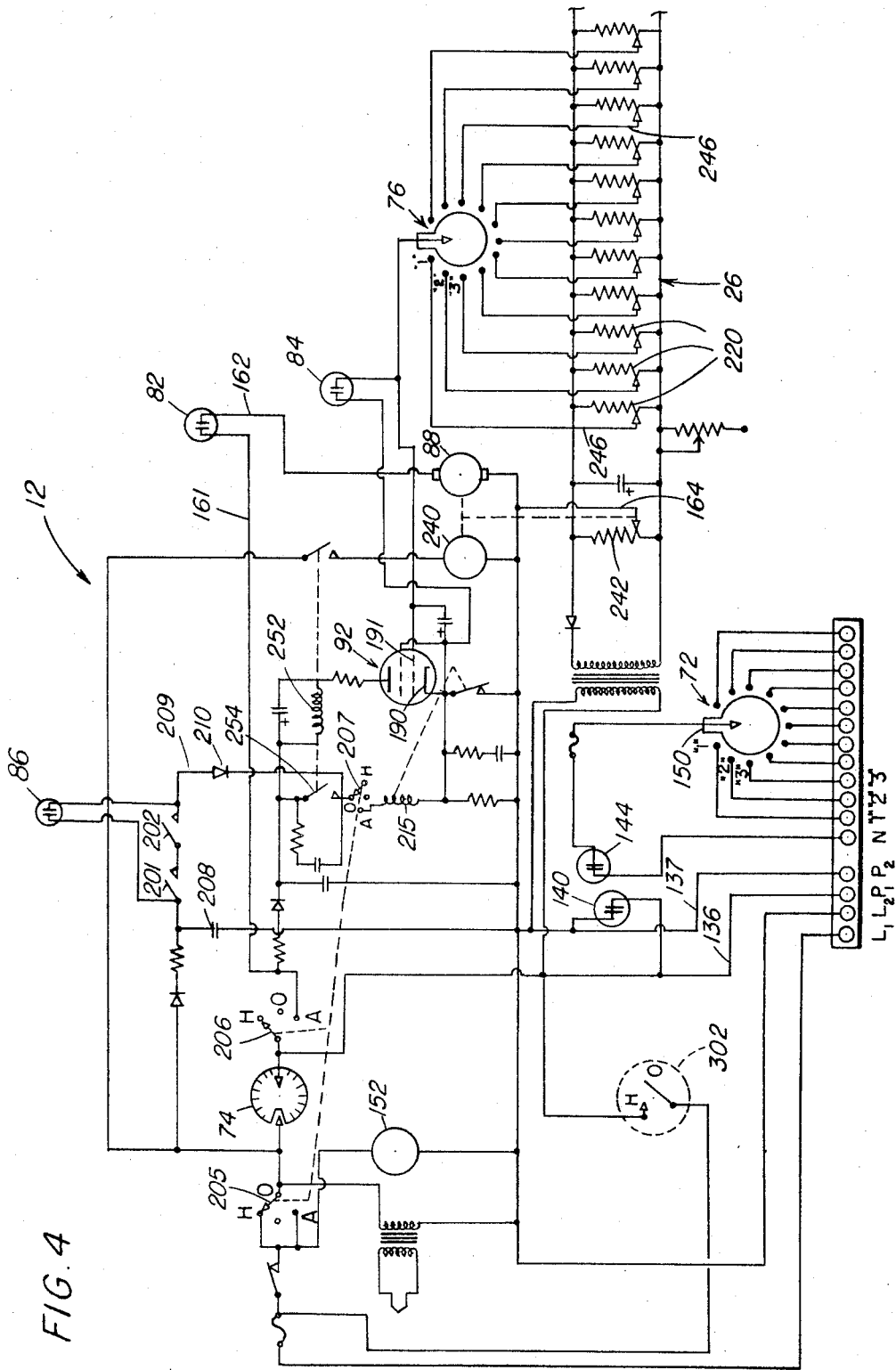
FIGURE 4 is a wiring diagram of the electronic programmer used in conjunction with the system for controlling operation of the same automatically.

The electronic programmer 12 provides the means for controlling automatically each of the controlling circuits in the system. In general, the programmer 12 is a model EV23 electronic controller manufactured by Telsco Industries of Dallas, Tex., as modified by the teaching of the present invention and is mounted within the lower section portion of control unit 10. Referring concurrently now to FIGURES 3 and 4 of the drawings, the programmer 12 is provided with a number of terminals, two of which, $L_1$ and $L_2$ constitute power input terminals for connecting the programmer 12 with a constant voltage source. For the programmer 12 to operate properly, the voltage thereto should not fluctuate through wide limits. Thus a constant output voltage transformer 24 is mounted in the control unit adjacent the programmer, the primary 132 of the transformer being connected to a 60 cycle A.C. power source which normally may vary between 95 and 130 volts. The secondary 133 of the constant voltage transformer is connected to terminals $L_1$ and $L_2$ and provides a constant 60 cycle A.C. voltage of 118 volts to the programmer.

As seen in FIGURE 4 the terminals $L_1$ and $L_2$ are also connected through suitable circuitry to programmer terminals $P_1$, $P_2$, the pair of leads 136 and 137 associated with the latter also being connected to a quick connect terminal outlet 140 within the programmer. The quick connect terminal outlet 140 in turn is connected with the primary winding 141 of a multitap, step down transformer 28 mounted in the control unit alongside the programmer, the primary winding thereby being connected with the 118 volt output of transfermor 24. The secondary 142 of the step down transformer 28 is connected to another quick connect terminal outlet 144 and steps down the potential available thereat to some lesser constant voltage value as determined by the setting of rotary selector switch 146 and given by way of example herein as being 28 volts, a voltage of the magnitude required for operating the solenoids 50 of the sprinkler control valves 48. The two terminals of quick connect terminal outlet 144 are in turn connected to programmer neutral or common terminal N and the rotor contact 150 of a stepping switch 72 adapted, when stepped through its various switch positions, to connect successively each of the programmer power terminals "1,"

"2," "3," etc., associated with corresponding controlling circuits in the system with the 28 volt power surce.

The programer circuit also includes a timer motor 152 which is constantly operated to drive a timer switching mechanism used to activate the irrigation system and control same automatically, a circuit indicator stepping switch 74 having switch positions associated with each controlling circuit, a potentiometer device stepping switch 76 also provided with switch positions corresponding to each controlling circuit, a clock operated day selector switch 78, a clock operated time of day selector switch 80, and a number of additional quick connect terminal outlets 82, 84 and 86, the function of which will be described now.

Quick connect terminal outlet 82 is similar to all previously described terminal outlets in that it is provided with two terminals therein. The two terminals are not, however, interconnected so that the leads 161 and 162 connect with the respective terminals constitute part of a discontinuous or open circuit path to the high side of electric drive motor 88 used to operate a potentiometer wiper arm 164. This discontinuous circuit path is made continuous or is closed by means of a "memory circuit" device shown generally at 26 in FIGURE 3. The memory circuit device 26 includes a pair of leads 166, 167 connected respectively with the two terminals of terminal outlet 82 and also connected in series with the contacts 168 of a normally closed electrical relay 169. The relay 169 is preferably a manual reset type that requires resetting with a push button 170. Relay 169 is in turn series connected wtih a pressure operated safety switch 90 located at the system pump unit location. The safety switch 90 is intended to operate to shut down the pump drive means 42 in the event the pump output pressure should exceed a safe limit. When switch 90 is closed by excessive pressure, relay 169 is energized and its contacts 168 open in turn causing opening of circuit continuity to motor 88. When motor 88 stops, the automatic control of any controlling circuit then operating ceases. Thus, when the condition that caused pump shut down is corrected and the pump 40 started up anew the programmer operation will begin at the "memorized" point of operation existing at the time of shut down.

Quick connect terminal outlet 86 is associated with an alternate timing switch control unit 22 (FIG. 3). The latter unit includes a day selector 181, a time of day selector 182, a hand-off automatic selector 183, a prestart timing selector 184, a main control switch 185, a prestart control switch 186, and power leads 187 and 188 connected to a 60 cycle A.C. 115 volt power source to operate a motor in the unit (not shown). As will be noted, the terminals of main control switch 185 are connected by suitable leads to the two terminals of quick connect terminal outlet 86. By thus connecting the main control switch 185 to the terminals of terminal outlet 86, the electronic programmer 12 can be turned on independently of the controls normally used to initiate automatic operation of the irrigation system.

The terminals of quick connect terminal outlet 84 are connected across the cathode 190 and control grid 191 of a vacuum tube 92 (tetrode) in the programmer 12. Thus a voltmeter 32 connected to the terminals of terminal outlet 84 and calibrated with a scale graduated in minutes in lieu of voltage differential can be utilized to give visual indication of the time remaining in the operation of any controlling circuit. Better understanding of this feature will become more apparent later when the operation of the entire system is described.

Located at the system pumping unit and constituting part of the respective controlling circuits is a pressure controller assembly shown generally at 18 in FIGURE 3. The pressure controller assembly 18 comprises a number of pressure actuated switches 193 which are adapted to be electrically connected to a reversible drive motor 194 controlling the throttle setting of the water pump drive unit 42. Since pump pressure varies directly with the r.p.m. thereof, a variation in the speed of the pump drive unit will correspondingly change the pump output pressure. The purpose of each of the pressure controllers is to maintain water pressure at the sprinkler heads associated with the respective controlling circuits within requisite limits so that the sprinkler heads will operate according to the manufacturer's specifications. The pressure actuated controllers are connected in circuit with the throttle control drive motor 194 as shown and with corresponding contact switches 196 at the central control unit and operated by an associated relay 197, the respective relays 197 being connected by leads 198 to the programmer terminals "1," "2," "3," etc., corresponding to the respective controlling circuits.

A better understanding of the construction of the system will be apparent from a description of the manner in which the same operates. Assuming that it is desired to place the system in automatic operation, the programmer day selector switch 78, which is a switch having a dial and switch positions corresponding to the seven days of the week, is set by moving the dial to the selected day position. Day selector switch 78 controls switch 201 in the programmer circuit. The time of day in which the operation is to be initiated is also set into the time of day selector switch 80 which is similar in construction to the day selector switch 78 except that it has twenty-four positions and is used to control closure of programmer circuit switch 202. The manual-off-automatic switch 80 (a three-position switch) is then set in its automatic position moving in consequence the programmer switches 205, 206 and 207 to the automatic terminal positions thereof. As a practical precaution it is desirable to move all switches in the system to an "Off" position when first turning on power to the programmer.

As mentioned, day selector switch 78 and time of day switch 80 are clock operated switches, the clock motor being powered by timer motor 152 so that at the appointed time, switches 201 and 202 in the programmer 12 are closed. When switches 201 and 202 close, capacitor 208 discharges through the circuit loop 209 containing diode 210 and as a consequence control coil 215 is momentarily energized. Control coil 215 is adapted when energized to advance stepping switch 72 to its first contact position associated with the first controlling circuit thereby connecting said circuit with the 28 volt output of step down transformer 28. Control coil 215 also steps circuit indicator stepping switch 74 to its first contact position, and also steps potentiometer stepping switch 76 to its first contact position wherein the potentiometer 220 associated with the first operating circuit is connected to the control grid 191 of tetrode 92. Simultaneous with the movement of the respective stepping switches 72, 74, 76, to their first contact position, relay 222 connected across terminals P₁, P₂ in the programmer is energized and its contacts close to connect with power the circuit 224 controlling the starting of the pump unit drive means. At the start of the operating cycle of the first system controlling circuit, the said circuit is connected with the 28 volt power source since terminal "1" in the programmer being connected by lead 224 with relay 197 causes the contacts thereof to close and completes a circuit by means of lead 230 from the step down transformer secondary 142 to the lead 124 connected between the relay contacts and the leftmost vertical row of terminal outlets 62 and hence to the sprinkler heads associated therewith.

With the first controlling circuit in a powered condition and at the commencement of its operating cycle, drive motor 88 in the programmer 12 also starts to operate. The motor 88 is connected with a clutch unit 240 which is normally engaged with motor drive being held in that condition by a spring means (not shown). The clutch 240 in turn is connected with potentiometer wiper arm 164 which slides along balance potentiometer 242 connected in series with the cathode 190 of the tetrode 92, the connection being through a normally closed switch 244. The balance potentiometer 242 serves in conjunction with the various controlling circuit potentiometers 220 to control the time of operation of each controlling circuit in the manner now to be described.

At the start of the operating cycle of the first controlling circuit (time equals zero minutes), wiper arm 164 is engaged with balance potentiometer 242 at the top thereof when viewed in FIGURE 4. This contact position corresponds with a zero potential at the cathode 190 of tetrode 92. The potentiometer 220 associated with each controlling circuit and connected in series with the control grid 191 of the tetrode 92 also has a wiper arm 246 which can be set by means of knobs 250 on the panel board in a position corresponding to a predetermined potential value at the control grid (as for example 35 volts), and effective to permit circuit operation for a time period related to the selected potential value. As long as a voltage differential exists between the cathode 190 and the control grid 191 of the tetrode 92, the tetrode is nonconducting and the first controlling circuit continues to operate.

However, as it continues to operate, motor 88 drives wiper arm 164 downwardly and the potential value at the cathode increases. Ultimately, when the wiper arm 164 reaches a contact position on balance potentiometer 242 associated with a cathode potential equal to that at the control grid (zero differential), the tetrode becomes conductive (fires). When the tetrode fires, relay 252 is energized closing switch 254 and control relay 215 is once again momentarily energized to advance all stepping switches 72, 74, 76 to their second contact positions associated with the second controlling circuit. As control relay 215 is momentarily energized, it opens switch 244 and clutch 240 is by means (not shown) disengaged from the drive of motor 88 permitting a spring (not shown) to pull wiper arm 164 back up to a zero position.

During the time period the first controlling circuit is operating, the time remaining in its cycle of operation can be read directly on voltmeter 32 which has a scale graduated to show time in minutes, the latter being a function of the voltage differential between the tetrode control grid and cathode.

With the system under control of the electronic programmer 12, the circuit path to the solenoids 50 in the field through the first controlling circuit is through the leftmost vertical row of matrix terminal outlets 62, the respective power leads 104a–104g of that circuit, the respective field leads 112a–112g of that circuit and the high voltage connector leads 114 of the solenoids 50. The common wire terminals of the solenoids are, as was previously mentioned, connected in parallel with each other and with common return loop 66 to the programmer neutral terminal N. When the solenoids 50 are energized, they cause the respective water control valves 48 to open and the pop-up type sprinkler heads 52 associated therewith rise from the ground and sprinkle water over the playing hole areas in the usual manner. As was pointed out earlier in the description, each controlling circuit is connected with a number of sprinkler heads selected on the basis of having equal or near equal water pressure head requirements taking into account the dynamic and static water pressure losses accruing at the respective sprinkler heads. Accordingly, it is desirable to keep the operating water pressure at the respective circuit sprinkler heads within the stated limits. Thus, for example, if the sprinkler heads in the first controlling circuit require a pressure of 80 p.s.i.g. and the hydraulic losses are 21 p.s.i.g., a pump output pressure of 101 p.s.i.g. must be maintained in the manner now to be described. The first controlling circiut also includes an associated pressure controller device (previously referred to) which functions to control the throttle setting on the pump unit drive means 42 to maintain the speed thereof commensurate with that required to keep the pump output pressure in a range of about 99–103 p.s.i.g. The pressure controller device includes a pair of contacts 196, 256 which close when coil 197 is energized and which are connected respectively with the high voltage side terminals of reversible electric motor 194 controlling the throttle setting at the pump drive means 42. Completion of a circuit to the reversible motor occurs when the switch blade of two position switch 193 is closed against one or the other of two contacts 260, 261 associated respectively with high pressure and low pressure variations from the predetermined intended sprinkler head operating pressure value. Thus if the pump pressure rises above 103 p.s.i.g., switch blade 193 is moved to an up position (FIG. 3) contacting contact 260. A circuit to motor 194 is thereby closed and it is caused to move the pump drive means throttle rod 262 to slow down the pump drive means until the pressure at the pump outlet returns to 101 p.s.i.g. On the other hand, if the pump pressure drops to 99 p.s.i.g., the switch blade 193 is moved down to engage contact 261 and motor 194 is driven in an opposite direction to speed up the drive means 42 until the pump pressure rises to 101 p.s.i.g. The positioning of the switch blade 193 can be controlled in known manner by a diaphragm means (not shown) connected to the pump discharge piping.

The manner of operation of the second controlling circuit in the system and all remaining controlling circuits is the same as that just described. The operating time of each controlling circuit need not be the same and can be varied for each circuit to suit particular soil requirements over a range of values, i.e., 0 to 60 minutes merely by changing the setting of the associated potentiometer control knob 250 which functions to alter the position of wiper arm 246 on the corresponding potentiometer 220.

If after one complete operation of all the controlling circuits in the system, i.e., the system has undergone one complete cycle of operation, it is desired to recycle same as during a particularly dry weather spell, the recycling can be done by employing the recycling unit 30 shown in FIGURE 3. The recycling unit 30 includes a multiposition selector switch 270 which can be set at the number of cycles to be employed and which is a motor driven switching unit. The selector switch is connected, as shown in FIGURE 3, across the external leads 271, 272 connected to quick connect terminal outlet 86 in the programmer 12. When the motor (not shown) drives the selector switch 270 to the selected closed position of same, a circuit is completed in the programmer 12 jumping switches 201 and 202 therein and capacitor 208 discharges in the manner previously described and the programmer operates in the same manner previously described for automatic operation thereof, i.e., stepping switches 72, 74 and 76 are stepped to a first contact position, etc. The recycling unit 30 is advantageously employed where it is desired to water the course in a number of short operating time periods (for example 15 minutes) for each controlling circuit instead of one long operating time period (one hour). In this manner the soil has ample time to absorb the water. If the selector switch is set for 3 recycle periods, the foregoing described events will recur two additional times before the unit shuts off.

The alternate timing switch control unit 22 is used to control automatic system operation in lieu of control by means of day selector switch 50, and time of day switch 51. The control unit 22 includes time of day switch 182 and day selector switch 181 which are set in the same manner as switches 50, 51 and being motor-driven clock operated type switches which control the closing of contact switch 185. A hand-off-automatic selector 183 is then set in the automatic position and prestart selector 184 set to close an associated set of contacts 186 about 1 to 3 minutes in advance of initiation of system operation to fulfill a function as follows. One to three minutes before the system is to start, contacts 186 will close making a circuit from the power leads 280 and 281 connected with a Klaxon horn or other warning device 285 located in the field at each playing hole 56 for the purpose of appraising at the sounding thereof any golfers in the vicinity of the advent of the watering cycle. Also the circuit through contacts 186 causes relay 286 to become energized, closing another set of contacts 287 and thereby closing a circuit 288 to an electrical solenoid operated lubricating valve (not shown) on the system water pump unit thereby permitting water to flow to and lubricate the bearings thereof before start. When the selected time for system start arrives, the contacts 185 close and a circuit is thereby completed through quick connect terminal outlet 86 by passing switches 201, 202 in the programmer to start operation thereof in the same manner as previously described. The advantage of using alternate timing switch control unit in the system is that it provides for inclusion of the prestart control means, a feature not incorporated with the timing control devices of the programmer unit 12.

It is also possible to control the operation of all the sprinkler heads 52 in any controlling circuit, any one sprinkler head in said circuit, or any other sprinkler head on the golf course manually either from the central control location or in the field. The various arrangements for manual control now will be described.

All sprinkler heads 52 in any one controlling circuit can be controlled from the central station with manual control switch 300 in the electronic programmer (FIG. 3). If so operated, the sprinkler heads will operate as long as the manual control switch 300 is set in the switch position corresponding to the particular controlling circuit. To effect manual control of any controlling circuit, the switches 301 and 183 on the control unit must be set in "hand" position and the hand-off switch 302 set in a "hand" position. The latter switch 302 is located in the programmer with its control knob being exterior of the control unit and is used to connect the primary 141 of transformer 28 with 118 volts of power. Manual control switch 300 also is mechanically connected with the stepping switches 72, 74 and 76 so that in effect by setting it in a given contact position, the respective stepping switches are moved to corresponding positions. Thus moving the manual control switch 300 to the "1" position energizes the first controlling circuit in the same manner as when under automatic control causing energization of the relay 197, closing of the pressure controller unit contacts etc. However, no stepping of the switches 72, 74 and 76 to a second contact position can occur since with switch 301 in a hand position, control relay 215 cannot be energized to effect stepping of these switches.

It is also possible to control at the central control location all or any one of the sprinkler heads 52 in a controlling circuit by utilizing the vertical row of manual control terminal outlets 64 denoted generally at 16 in FIGURE 3. In this instance, hand-off switch 302 is first set in the "hand" position, and switches 301 and 183 at the control unit are set in the "hand" position. A jumper lead (not shown) is then connected between one of the terminal outlets 64 (which are connected with power by leads 230 and 231) and either (1) the bottom or top terminal outlet 62 in the vertical terminal matrix row corresponding to the operating circuit or (2) directly to the left hand terminal 101 of the panel board terminal outlet 58 corresponding to the sprinkler head to be operated. If the jumper lead is connected with the quick connect terminal outlet 58, the clip connector 103 at the front side of the outlet should first be removed before connecting the lead to terminal 101. The clip connector, of course, should be replaced at the end of the manual control period. In this condition of manual control, a separate pressure controller unit 20 is utilized to maintain pump pressure within predetermined limits in the same manner as described for automatic system operation.

A third manner of manual control at the central control station involves setting hand-off switch 302 in a "hand" position, and manually closing one or more double pole, single throw switches 310 at manual switching station unit 315. When the switches 310 are closed they connect single terminal quick connect outlets 316 with the manual control terminal outlets 64 and also the timers 318 with a source 320 of 115 volt power. A jumper lead (not shown) is then connected between the single terminal outlets 316 and the left hand terminal 101 of the panel board terminal outlets 58 corresponding to the sprinkler heads to be controlled (once again, the clip connector 103 should first be removed). By referring to the timers, the operator at the central control location can then open switches 310 by hand at the end of the intended watering period.

A fourth manner of manual control of the sprinkler heads in the field involves throwing a switch 325 (FIG. 3) in the field at the location of the sprinkler heads involved. This is a particularly useful arrangement for syringing greens areas and merely requires that the operator in the field position the hand operated switch 325 from a left to a right hand contact position thereby connecting the associated field power lead connected with the solenoid with power by means of the manual control terminal outlets 64 rather than by means of the panel board terminals. Only two such switches 325 are shown in the drawings as it will be apparent that a number of these switches can be connected in parallel with the manual control terminal outlets. Of course this field control of any sprinkler head also requires that switch 302 at the central control location be positioned in a "hand" position.

It should be apparent that regardless of which of the above described manual control methods is employed for controlling various sprinkler heads, only as many sprinkler heads as can be adequately supplied concurrently from the pump unit should be operated at any one time.

FIGURES 5 and 6 illustrate one manner of connecting the various field power leads 112a–112f, 212a–212f, etc., with the respective solenoid power leads 114 as well as the common wires 66 with solenoid common leads 340. In making the connection, the power lead 112a and solenoid power lead 114 are skinned of insulation 360 at the ends to expose the respective conductors 112a' and 114'. The skinned ends are then joined by using a threaded crimp connector nut 361 and the join enhanced by soldering as at 362. An insulating cap 363 having an internal thread and being filled with a silicone sealant 364 is threaded on the connector nut 361. Additional silicone sealant 364 is then applied around the skinned ends of the leads and for a distance along the remaining insulated portions of the leads as at 365. The silicone sealant is then allowed to set up for a period of about 30 minutes. The resulting connection is completely moisture-proof in character.

Thus it will be seen that the present invention provides an irrigation system which possesses a number of advantages over prior art systems. Most notably it permits system control from a single central location, yet it possesses sufficient flexibility in design to enable a workman in the field to water selectively by manual control any portion of the land area in particular need for extra watering. An obvious advantage of the system of course is the considerable labor saving it provides by eliminating the need for workmen to travel around the golf course to control the operation of the sprinkler heads. Furthermore, the use of the panel board 36 at the central control location provides visual status of the system operating condition at any given time. Finally, the system is designed to provide against human error in controlling the irrigation of large land areas thereby insuring that all land segments are watered and watered properly.

It will be apparent that the system of the present invention is subject to a certain amount of modification. For example, each controlling circuit can be adapted to control more sprinkler heads than described by increasing the capacity of the pump unit. It is also possible to denote the various panel board terminal outlets 58 with a color scheme arrangement related to the purpose of the sprinkler head associated therewith. For example, the outlets 58 which transfer electrical power to operate the sprinkler heads at the playing hole green areas can be colored green, the T area outlets colored red, the fairways brown and the traps yellow.

It will thus be seen that the objects set forth above, among those made apparent from the preceding description, are efficently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

What is claimed is:

1. In an irrigation system for watering a land area at a plurality of locations by controlling a corresponding plurality of solenoid operated sprinkler valves, a control unit having a panel board therein on which is pictorially depicted the land area being watered, a plurality of terminal outlets on said panel board corresponding to the plurality of sprinkler valves, each terminal outlet comprising a left and a right hand terminal, and a connector interconnecting said terminals, a matrix of power transfer terminal outlets mounted on said control unit, each power transfer terminal outlet in the matrix having a pair of terminals, a power lead connecting the left hand terminal of each panel board terminal outlet with the solenoid of the corresponding sprinkler valve, a power lead connecting the right hand terminal of each panel board terminal outlet with a terminal of one of said power transfer terminal outlets, a source of electrical power at said control unit and having a power terminal and a common terminal, means interconnecting the power terminal of said source of electrical power with the terminals of each of said power transfer terminal outlets, and common connector means interconnecting each sprinkler valve solenoid with the common terminal of said source of electrical power.

2. In an irrigation system for watering a land area at a plurality of locations by controlling with a designated number of controlling circuits, a corresponding plurality of solenoid operated sprinkler valves, each controlling circuit being associated with only certain of said sprinkler valves, the sprinkler heads associated with each controlling circuit being different than those associated with any other controlling circuit, a control unit having a panel board therein on which is pictorially depicted the land area being watered, a plurality of terminal outlets on said panel board corresponding to the plurality of sprinkler valves, each terminal outlet comprising a left and a right hand terminal, and a connector interconnecting said terminals, a matrix of power transfer terminal outlets mounted on said control unit, said matrix being comprised of a number of rows of power transfer terminal outlets, each row comprising part of one of said controlling circuits, each power transfer terminal outlet in the matrix having a pair of termnials, the terminals of all the power transfer terminal outlets in each row being electrically interconnected, a power lead connecting the left hand terminal of each panel board terminal with solenoid of the corresponding sprinkler valve, a power lead connecting the right hand terminal of each panel board terminal outlet with a terminal of one of said power transfer terminal outlets, a source of electrical power at said control unit and having a power terminal and a common terminal, programmer means operable to connect electrically in predetermined sequential order the power terminal of said source of electrical power with at least one of the terminals in each row of power transfer terminal outlets, and common connector means interconnecting each sprinkler valve solenoid with the common terminal of said source of electrical power.

3. The system of claim 2 wherein said source of electrical power comprises the power terminal and common terminal of the secondary coil of a transformer, said programmer means comprising a programmer unit having a switch therein moveable through successive switch positions associated with each controlling circuit, said switch in each of said switch positions electrically interconnecting the power terminal of said transformer with the associated controlling circuit.

4. The system of claim 3 wherein said programmer unit includes a tetrode having a cathode and a control grid, said tetrode when conductive being effective to advance said switch through its successive switch positions, said programmer unit further comprising means for maintaining said switch in each switch position for a predetermined period of time, said means comprising a potentiometer associated with each of said switch positions and electrically connected with said control grid when said switch is a corresponding switch position thereby to maintain a predetermined potential at said control grid, a balance potentiometer connected with the cathode of said tetrode, and means constantly varying the potential applied to said cathode by said balance potentiometer during said time period from a zero value to a predetermined value equal to the potential at said control grid, a differential between the potentials at said control grid and cathode being effective to render said tetrode nonconductive.

5. The system of claim 4 wherein a voltmeter is connected across the control grid and cathode of said tetrode to record the voltage differential therebetween, the scale of said voltmeter being calibrated in divisions of time to denote the time period remaining in the operation of the respective controlling circuits.

6. The system of claim 4 wherein the means for constantly varying the potential applied to said cathode comprises a wiper arm in contact with said balance potentiometer and connected with said cathode, and a drive motor connected with said wiper arm for moving said wiper arm along said balance potentiometer between positions corresponding to a zero value of potential and a higher predetermined maximum potential value.

7. The system of claim 6 wherein said drive motor is connected in series with a memory circuit device, said memory circuit device being activated by one or more safety devices for shutting down operation of the system, said memory circuit device being operative when activated to open the power circuit to said drive motor.

8. The system of claim 2 wherein said system further comprises a manual control device for controlling the solenoid operated sprinkler valves, said manual control device comprising a plurality of manual control terminal outlets, and means electrically connecting each of said manual control terminal outlets with the power terminal of said source of electrical power, said manual control terminal outlets and the panel board outlets being adapted to receive the ends of a jumper lead for electrically interconnecting said outlets.

9. The system of claim 2 wherein said panel board is provided with a plurality of indicator lamps mounted therein adjacent corresponding panel board terminal outlets, said indicator lamps being electrically connected with said panel board terminal outlets.

10. The system of claim 2 wherein resistors are connected in series with each power lead connecting the left hand terminal of the panel board terminals with the solenoids of the corresponding sprinkler valves to equalize the circuit resistance of the respective controlling circuits.

11. In an irrigation system for watering the playing holes of a golf course by controlling with a designated number of controlling circuits a plurality of solenoid operated sprinkler valves located along the playing holes, each controlling circuit being associated with only certain of said sprinkler valves, the sprinkler heads associated with each controlling circuit being different than those associated with any other controlling circuit, a control unit having a panel board therein on which is depicted a plan outline of each of the golf course playing holes, a plurality of terminal outlets on said panel board corresponding to the plurality of sprinkler valves, each terminal outlet being arranged on said panel board at a location corresponding to the location at the playing hole of the sprinkler head associated with said terminal outlet, each terminal outlet comprising a left and a right hand terminal, and a connector interconnecting said terminals, a matrix of power transfer terminal outlets mounted on said control unit, said matrix being comprised of a number of rows of power transfer terminal outlets, each row comprising part of one of said controlling circuits, each power transfer terminal outlet in the matrix having a pair of terminals, the terminals of all the power transfer terminal outlets in each row being electrically interconnected, a power lead connecting the left hand terminal of each panel board terminal with the solenoid of the corresponding sprinkler valve, a power lead connecting the right hand terminal of each panel board terminal outlet with a terminal of one of said power transfer terminal outlets, a source of electrical power at said control unit and having a power terminal and a common terminal, programmer means operable to connect electrically in predetermined sequential order the power terminal of said source of electrical power with at least one of the terminals in each row of power transfer terminal outlets, and common connector means interconnecting each sprinkler valve solenoid with the common terminal of said source of electrical power.

12. A system for controlling pressure and distribution of water in a land area irrigation system which includes a plurality of sprinkler heads separable into a designated number of groups of sprinkler heads with the sprinkler heads in each group having substantially equal operating head pressure requirements, water mains, pumping means supplying a pressurized flow of water to said water means, and branch lines connecting the sprinkler heads with said water mains, said control system comprising:
  (a) a valve controlling each sprinkler head;
  (b) a solenoid controlling each valve and having first and second input terminals;
  (c) an electrical power supply having first and second output terminals;
  (d) first circuit means connecting said power supply second output terminal and all said solenoid second output terminals in common;
  (e) a programmer having an input terminal connected to said power supply first output terminal and a plurality of output terminals corresponding in number to said sprinkler head groups, said programmer including means connecting said programmer input terminal in predetermined sequential order with each of said programmer output terminals;
  (f) second circuit means comprising a plurality of independent controlling circuits corresponding in number to said sprinkler head groups, each controlling circuit having a first terminal connected in common with the first solenoid input terminals of solenoids in each sprinkler head group, and a second terminal; and
  (g) a switch control unit comprising a plurality of relays corresponding in number to said sprinkler head groups, each relay having a first contact connected to a respective one of said controlling circuit second terminals and a second contact connected to said power supply first terminal, each relay having actuating means connected to a respective one of said programmer output terminals to be energized as said programmer means connects said programmer input terminal with said respective programmer output terminal, to energize the solenoids of one of said sprinkler head groups.

13. The system of claim 12 further comprising:
  (a) means associated with said pumping means for varying the pressure of said flow of water;
  (b) said switch control unit including pressure control means for generating a particular pressure control signal upon energization of each said relay actuating means; said pressure control signal corresponding to the operating head pressure requirement of the sprinkler head group associated with said relay, and
  (c) third circuit means connecting said pressure control signal generator to said variable pressure means to control same.

14. The control system of claim 12 wherein each independent controlling circuit includes a plurality of switching means corresponding in number with the sprinkler heads in the group controlled therewith, each switching means being connected in series between each first solenoid input terminal and said common terminal connection and comprising a terminal outlet having a first terminal, a second terminal and a removable jumper interconnecting said terminals.

15. The control system of claim 14 including further a panel board on which is pictorially depicted the land area being watered, the terminal outlets comprising said switching means being located on said board in correspondence to the actual land location of the sprinkler head associated therewith.

References Cited
UNITED STATES PATENTS

| | | | |
|---|---|---|---|
| 2,906,810 | 9/1959 | D'Ascoli | 174—76 X |
| 3,328,512 | 6/1967 | Lembke et al. | 174—76 X |
| 3,351,785 | 11/1967 | Craig et al. | 239—66 X |

STANLEY H. TOLLBERG, *Primary Examiner.*